(12) United States Patent
Natsume

(10) Patent No.: US 9,077,842 B2
(45) Date of Patent: Jul. 7, 2015

(54) IMAGE PICKUP APPARATUS HAVING ABERRATION CORRECTING FUNCTION AND ABERRATION CORRECTING METHOD FOR IMAGE PICKUP APPARATUS

(75) Inventor: Satoshi Natsume, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/579,385

(22) PCT Filed: Mar. 28, 2011

(86) PCT No.: PCT/JP2011/058475
§ 371 (c)(1),
(2), (4) Date: Aug. 16, 2012

(87) PCT Pub. No.: WO2011/122693
PCT Pub. Date: Oct. 6, 2011

(65) Prior Publication Data
US 2012/0300112 A1  Nov. 29, 2012

(30) Foreign Application Priority Data
Mar. 31, 2010 (JP) .................................. 2010-084031

(51) Int. Cl.
*H04N 5/217* (2011.01)
*H04N 5/222* (2006.01)
(Continued)

(52) U.S. Cl.
CPC .................. *H04N 9/045* (2013.01); *G03B 5/02* (2013.01); *G03B 17/00* (2013.01); *G06T 3/005* (2013.01); *H04N 5/23209* (2013.01); *H04N 5/3572* (2013.01)

(58) Field of Classification Search
CPC ......... H04N 5/217; H04N 5/222; H04N 5/76; H04N 13/00; H04N 9/045; H04N 5/23209; H04N 5/3572; G06K 9/00; G06T 3/005; G03B 17/00; G03B 5/02

USPC ......... 348/336, 335, 345–356, 240.99, 240.1, 348/239, 180, 187, 333.12, 222.1, 360, 348/231.99, 241, 223.1; 382/162, 167, 255, 382/246
See application file for complete search history.

(56) References Cited

U.S. PATENT DOCUMENTS 5,227,832 A * 7/1993 Kawasaki et al. ................ 396/81
6,646,760 B1 * 11/2003 Hanihara ....................... 358/1.9
(Continued)

FOREIGN PATENT DOCUMENTS

| JP | 61-225988 A | 10/1986 |
|---|---|---|
| JP | 2000-83157 A | 3/2000 |

(Continued)

OTHER PUBLICATIONS

T. Yamashita et al., "A Lateral Chromatic Aberration Correction System for Ultahigh-definition Color Video Camera", Proc. SPIE-IS &T, vol. 6068N, p. 6068N-1 to 6068N-8 (2006).*
(Continued)

*Primary Examiner* — Tuan Ho
*Assistant Examiner* — Marly Camargo
(74) *Attorney, Agent, or Firm* — Fitzpatrick, Cella, Harper & Scinto

(57) ABSTRACT

An image pickup apparatus includes a lens apparatus attached to a camera apparatus detachably, and a camera apparatus separating a beam into color beams of three colors and displays an image synthesizing first, second and third image signals, wherein the lens apparatus includes a memory unit storing correcting data in an image height direction of the second and third image signals on the first image signal for correcting aberration of the image taking optical system, and a lens controlling unit extracting the correcting data of the image taking optical system state, wherein the camera apparatus includes a camera controller moving the second and third image signals in the image height direction, and displaying an image obtained by superimposing the color image signals, wherein the image pickup apparatus includes a controller, and wherein the lens controlling unit adjusts the correcting data, and the memory unit stores the adjusted correcting data.

21 Claims, 13 Drawing Sheets

(51) Int. Cl.
| | |
|---|---|
| H04N 5/76 | (2006.01) |
| G06K 9/00 | (2006.01) |
| H04N 9/04 | (2006.01) |
| G03B 5/02 | (2006.01) |
| G03B 17/00 | (2006.01) |
| G06T 3/00 | (2006.01) |
| H04N 5/232 | (2006.01) |
| H04N 5/357 | (2011.01) |

(56) References Cited

U.S. PATENT DOCUMENTS

| | | | |
|---|---|---|---|
| 6,747,757 B1* | 6/2004 | Enomoto | 358/1.9 |
| 7,321,685 B2 | 1/2008 | Okada et al. | |
| 7,425,988 B2 | 9/2008 | Okada et al. | |
| 2004/0150732 A1* | 8/2004 | Yamanaka | 348/272 |
| 2004/0218813 A1* | 11/2004 | Okada et al. | 382/167 |
| 2005/0179788 A1* | 8/2005 | Okada et al. | 348/222.1 |
| 2008/0007630 A1* | 1/2008 | Hara | 348/223.1 |
| 2008/0240709 A1 | 10/2008 | Nakamura | 396/529 |
| 2008/0291447 A1* | 11/2008 | Vakrat et al. | 356/364 |
| 2009/0009633 A1* | 1/2009 | Suto | 348/241 |
| 2009/0052769 A1* | 2/2009 | Kang et al. | 382/162 |
| 2009/0167925 A1* | 7/2009 | Murata | 348/345 |
| 2009/0202171 A1* | 8/2009 | Kasahara | 382/275 |
| 2009/0262231 A1 | 10/2009 | Murata et al. | |
| 2012/0300112 A1 | 11/2012 | Natsume | |

FOREIGN PATENT DOCUMENTS

| | | |
|---|---|---|
| JP | 2004-112529 A | 4/2004 |
| JP | 2004-336106 A | 11/2004 |
| JP | 2005-117332 A | 4/2005 |
| JP | 2006-135805 A | 5/2005 |
| JP | 2006-251846 A | 9/2006 |
| JP | 2006-270918 A | 10/2006 |
| JP | 2008-96907 A | 4/2008 |
| JP | 2008-219328 A | 9/2008 |
| WO | 2009/028180 A1 | 3/2009 |

OTHER PUBLICATIONS

J. Chang et al., "Correction of Axial and Lateral Chromatic Aberration with False Color Filtering", IEEE Transactions on Image Processing, vol. 22, No. 3, pp. 1186-1198 (Mar. 2013).*
International Search Report (PCT/ISA/210) and Written Opinion of the Searching Authority (PCT/ISA/237) dated Jun. 7, 2011 in International Application No. PCT/JP2011/058475.
Oct. 11, 2012 Notification Concerning Transmittal of Copy of International Preliminary Report on Patentability, Oct. 2, 2012 International Preliminary Report on Patentability.
Yamashita et al., "A Lateral Chromatic Abberation Correction System for Ultrahigh-definition Color Video Camera," International Society for Optical Engineering (SPIE-IS&T), vol. 6068, Jan. 1, 2006, pp. 60680N-1 through 60680N-8.
Brandon Oelling, "Cringe at the Fringe —Chromatic Abberation in Lightroom," http://x-equals.com/blog/cringe-at-the-fringe-chromatic-abberation-in-lightroom, XP002715694, Feb. 19, 2010.
European Search Report dated Nov. 15, 2013, in counterpart European Application No. 11762913.9 —1902/2529556.
Japanese Office Action dated Jan. 7, 2014, issued in counterpart Japanese Application No. 2010-084031, and English-language translation thereof.
Japanese Office Action dated May 27, 2014, issued in counterpart Japanese Application No. 2010-084031.
Chinese Office Action dated May 6, 2014, issued in counterpart Chinese Application No. 201180016001.X, and English-language translation thereof.
English-language translation of Japanese Office Action dated May 27, 2014, issued in counterpart Japanese Application No. 2010-084031.

* cited by examiner

FIG. 4

```
ABERRATION CORRECTION

CORRECTING MODE  : ON
ADJUSTING MODE   : ON
```

|  |  | IMAGE HEIGHT | | | | | |
|---|---|---|---|---|---|---|---|
|  |  | 0 | 1 | 2 | 3 | 4 | 5 |
| ZOOM POSITION | 0 | 0 | 1 | 1 | 1 | 2 | 2 |
|  | 2 | 0 | 1 | 1 | 2 | 2 | 3 |
|  | 4 | 0 | 1 | 1 | 2 | 3 | 3 |
|  | 6 | 1 | 1 | 1 | 2 | 3 | 4 |
|  | 8 | 1 | 2 | 2 | 3 | 5 | 5 |
|  | 10 | 2 | 2 | 2 | 4 | 5 | 7 |

| LENS APPARATUS | | | COEFFICIENT OF CORRECTION CONVERTING EXPRESSION | | | |
|---|---|---|---|---|---|---|
| ZOOM | FOCUS | IRIS | a | b | c | d |
| 7 – 10 m | 0.8 – 4 m | F1.8 | 1.250 | 0.150 | 1.750 | 0.000 |
|  |  | F4 | 1.570 | 0.220 | 2.340 | 0.005 |
|  |  | F5.6 | 2.180 | 0.540 | 3.360 | 0.020 |
|  | 4 – 8 m | F1.8 | 1.420 | 0.160 | 1.950 | 0.010 |
|  |  | F4 | : | : | : | : |
|  | 8 m – | F1.8 | 2.680 | 0.580 | 2.220 | 0.030 |
|  |  | : | : | : | : | : |
| 10 – 20 mm | 0.8 – 4 m | F1.8 | 1.750 | 0.380 | 0.780 | 0.020 |
|  |  | : | : | : | : | : |

FIG. 14A

| ZOOM POSITION | | IMAGE HEIGHT | | | | | |
|---|---|---|---|---|---|---|---|
| | | 0 | 1 | 2 | 3 | 4 | 5 |
| | 0 | 0 | 1 | 1 | 1 | 2 | 2 |
| | 2 | 0 | 1 | 1 | 2 | 2 | 3 |
| | 4 | 0 | 1 | 1 | 2 | 3 | 3 |
| | 6 | 1 | 1 | 1 | 2 | 3 | 4 |
| | 8 | 1 | 2 | 2 | 3 | 5 | 5 |
| | 10 | 2 | 2 | 2 | 4 | 5 | 7 |

FIG. 14B

| ZOOM POSITION | | IMAGE HEIGHT | | | | | |
|---|---|---|---|---|---|---|---|
| | | 0 | 1 | 2 | 3 | 4 | 5 |
| | 0 | 0 | 1 | 1 | 1 | 2 | 2 |
| | 2 | 0 | 1 | 1 | 2 | 2 | 3 |
| | 4 | 0 | 1 | 4 | 2 | 3 | 3 |
| | 6 | 1 | 1 | 1 | 2 | 3 | 4 |
| | 8 | 1 | 2 | 2 | 3 | 5 | 5 |
| | 10 | 2 | 2 | 2 | 4 | 5 | 7 |

FIG. 14C

| ZOOM POSITION | | IMAGE HEIGHT | | | | | |
|---|---|---|---|---|---|---|---|
| | | 0 | 1 | 2 | 3 | 4 | 5 |
| | 0 | 0 | 1 | 2 | 1 | 2 | 2 |
| | 2 | 1 | 2 | 3 | 2 | 2 | 3 |
| | 4 | 1 | 3 | 4 | 3 | 3 | 3 |
| | 6 | 1 | 2 | 3 | 2 | 3 | 4 |
| | 8 | 1 | 2 | 2 | 3 | 5 | 5 |
| | 10 | 2 | 2 | 2 | 4 | 5 | 7 |

FIG. 15

PARAMETER MEMORY

Rch : SET
Bch : SET

IMAGE PICKUP APPARATUS HAVING ABERRATION CORRECTING FUNCTION AND ABERRATION CORRECTING METHOD FOR IMAGE PICKUP APPARATUS

TECHNICAL FIELD

The present invention relates to a technology of correcting degradation in an image caused by various aberrations of a lens in an image pickup apparatus including a lens apparatus attached to a camera apparatus detachably.

BACKGROUND ART

In general, an image taking optical system of a lens apparatus has optical aberration (chromatic aberration and distortion) and an image taken through the image taking optical system contains degradation components according to the optical aberration.

Therefore, a conventional image taking system uses a method of reducing degradation components by computing an optical aberration amount on an image pickup surface of a camera apparatus on which an object image is formed by a lens apparatus and performing image processing (correcting process) with respect to a taken image based on the optical aberration amount.

PTL 1 discloses a method in which a camera apparatus preliminary holds data (aberration correcting data) regarding optical aberration of a lens apparatus and performs aberration correcting process. The camera apparatus determines a correcting amount in correcting process using the aberration correcting data and parameters of optical adjusting members such as a zoom, a focus and an iris of the lens apparatus.

Further, PTL 2 proposes a camera apparatus that identifies lens number and type and reads accurate correcting data based on the lens number and type, regarding a procedure for exchanging data of an electronic still camera or a video camera with an interchangeable lens.

In the system in which correcting data is changed according to a kind and use status of a lens as disclosed in PTL 1 and PTL 2, correcting data sent by a lens is changed along with a change in an optical system or correcting data to be used is selected from correcting data stored in a camera body. However, such a system does not assume the case where one interchangeable lens is attached to multiple different camera bodies as in a broadcasting lens or the case where one interchangeable lens is attached to a camera body under different image taking situations and in different image taking modes.

Broadcasting cameras may be required to have different resolutions, such as those for a high definition (HD), a standard definition (SD) or a cinema. On the other hand, even when the same lens is used, different color properties may be obtained from a combination of the lens and a camera, depending upon the kind of the camera. Thus, in an image pickup system for broadcasting, it is necessary to consider the case where the same lens is attached to different kinds of cameras or the case where images are taken under different image taking situations or in different image taking modes, even using the same type of camera.

When the number of kinds of lens apparatuses that can be attached to a camera apparatus increases in an image taking system with an interchangeable lens, it is difficult to retain aberration correcting data corresponding to all the lens apparatuses in the camera apparatus. In order to address such a problem, a lens apparatus is configured to hold aberration correcting data and to send the correcting data to a camera apparatus so that correcting process is performed. However, considering an individual difference and a production error in the lens apparatus, irrespective of whether the camera apparatus or the lens apparatus holds the aberration correcting data, the apparatus has only uniform aberration correcting data for one type of apparatus. Therefore, it is difficult to cover the errors of all the attachable lens apparatuses and perform aberration correction appropriately.

Further, in the future, when a resolution increases more and more as seen in Super Hi-Vision (SHV) and a demand for aberration correction with respect to a camera apparatus and a lens apparatus increases, it is necessary to realize aberration correction considering an individual difference and a production error of lens performance for each type.

Under such circumstances, the following is desired. A lens apparatus is configured to have basic aberration correcting data and, the aberration correcting data is finely adjusted in the lens apparatus when the lens apparatus is attached to a camera apparatus. The data after being adjusted is sent to the camera apparatus so as to be used for correcting process in the camera apparatus.

CITATION LIST

Patent Literature

PTL 1: Japanese Patent Application Laid-Open No. 2006-135805
PTL 2: Japanese Patent Application Laid-Open No. 561-225988

SUMMARY OF INVENTION

Technical Problem

The present invention has the following object. That is, in the case where a production error and an individual difference vary in an image pickup apparatus capable of correcting aberration using aberration correcting data, correcting data sent/received between a lens apparatus and a camera apparatus connected to the lens apparatus is changed by an adjusting unit provided in the lens apparatus, which enables aberration to be adjusted on a screen.

Solution to Problem

In order to achieve the above-mentioned object, the present invention provides an image pickup apparatus, including: a lens apparatus including an image taking optical system for guiding a beam from an object to a camera apparatus, the lens apparatus being attached to the camera apparatus detachably; and a camera apparatus that separates the beam from the object into color beams of three colors and photoelectrically converts the color beams into a first color image signal, a second color image signal and a third color image signal by corresponding image pickup elements to display, on an image displaying unit, an image obtained by superimposing the first color image signal, the second color image signal and the third color image signal, in which the lens apparatus further includes: a memory unit that stores, as correcting data including a parameter indicating a state of the image taking optical system, a correcting amount in an image height direction with respect to an image height in each of the second color image signal and the third color image signal, the correcting amount being obtained with the first color image signal being a reference, in order to correct aberration caused by the image taking optical system; and a lens controlling unit that extracts the correcting data corresponding to the state of the image taking optical system from the memory unit, in which the camera apparatus includes a camera controlling unit that moves the second color image signal and the third color image signal in the image height direction to correct the second color image signal and the third color image signal based on the correcting data, and displays, on the image displaying unit, an image obtained by superimposing the corrected second color image signal and the corrected third color image signal, in which the image pickup apparatus further includes a controlling unit to be used for specifying an arbitrary position of the image displayed on the image displaying unit and setting the correcting amount of the correcting data at the specified arbitrary position, and in which the lens controlling unit adjusts the correcting data based on the correcting amount of the correcting data at the arbitrary position set by using the controlling unit, and the memory unit stores the adjusted correcting data.

Further, in order to achieve the above-mentioned object, the present invention provides an aberration correcting method for an image pickup apparatus including: a lens apparatus including: an image taking optical system for guiding a beam from an object to a camera apparatus; and a memory unit that stores, as correcting data, a correcting amount with respect to an image height for correcting aberration caused by the image taking optical system, the lens apparatus being attached to the camera apparatus detachably; and a camera apparatus that separates the beam from the object into color beams of three colors and photoelectrically converts the color beams into a first color image signal, a second color image signal and a third color image signal to display, on an image displaying unit, an image obtained by superimposing the first color image signal, the second color image signal and the third color image signal, in which the correcting data indicating a correcting amount in an image height direction with respect to the image height in each of the second color image signal and the third color image signal, the correcting amount being obtained with the first color image signal being a reference, and including a parameter indicating a state of the image taking optical system, and in which the aberration correcting method for an image pickup apparatus further including: extracting the correcting data corresponding to the state of the image taking optical system from the memory unit; correcting the second color image signal and the third color image signal by applying the correcting data corresponding to the second color image signal and the third color image signal, and displaying, on the image displaying unit, an image obtained by superimposing the first color image signal, the second color image signal and the third color image signal; and in a case where a controlling unit of the image pickup apparatus is controlled to specify an arbitrary position of the image displayed on the image displaying unit, select one of the second color image signal and the third color image signal, and change the correcting data at the specified arbitrary position of the selected one of the second color image signal and the third color image signal, reflecting the change on the correcting data of the selected one of the second color image signal and the third color image signal based on the image height and a change amount corresponding to the arbitrary position of the image for which the correcting data is changed, and displaying, on the image displaying unit, an image obtained by superimposing the first color image signal, the second color image signal and the third color image signal.

Advantageous Effects of Invention

According to the present invention, in order to correct the variation of the production error and the individual difference in the image pickup apparatus capable of correcting aberration using aberration correcting data, the correcting data sent/received between the lens apparatus and the camera apparatus connected to the lens apparatus can be adjusted and changed by the adjusting unit provided in the image pickup apparatus, which enables the aberration to be adjusted on the screen.

BRIEF DESCRIPTION OF DRAWINGS

FIG. 4 is a display example of selectively switching a correcting mode and an adjusting mode in an adjustment displaying unit of the present invention.

FIG. 14A is a data table of a parameter correcting method of the present invention.

FIG. 14B is a data table of a parameter correcting method of the present invention.

FIG. 14C is a data table of a parameter correcting method of the present invention.

FIG. 15 illustrates a display example in which adjusted data in the adjustment displaying unit of the present invention is stored.

DESCRIPTION OF EMBODIMENTS

Hereinafter, exemplary embodiments of the present invention are described in detail with reference to the attached drawings.

Figure 1:
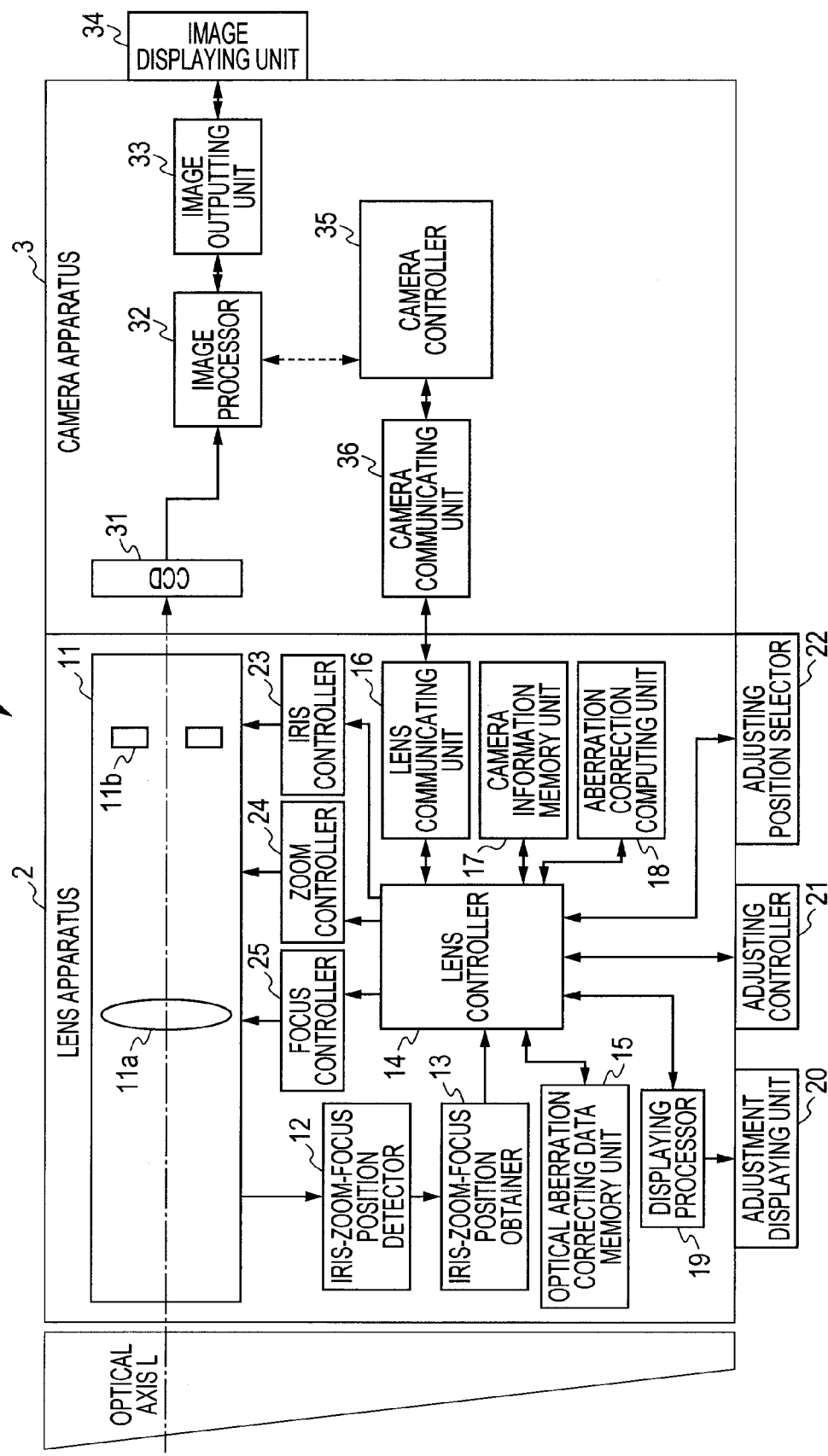
FIG. 1 is a block diagram illustrating a configuration of an image pickup apparatus of the present invention.

FIG. 1 is a block diagram of the embodiment according to the present invention, and FIGS. 3, 5, 16A, 16B and 17 are flowcharts of the embodiment according to the present invention.

Embodiment 1

Hereinafter, a configuration example is described with reference to FIG. 1, in which variations are satisfactorily corrected between individual apparatuses, which may occur when chromatic aberration correction is performed in an image taking apparatus such as a TV camera system according to Embodiment 1 of the present invention.

FIG. 1 is a block diagram illustrating a schematic configuration of an image pickup apparatus 1. As illustrated in FIG. 1, the image pickup apparatus 1 includes a lens apparatus 2 and a camera apparatus 3 and the camera apparatus 2 is attached to the camera apparatus 3 detachably.

The lens apparatus 2 includes an image taking optical system 11, an iris-zoom-focus position detector 12, an iris-zoom-focus position obtainer 13, a lens controller 14, an optical aberration correcting data memory unit 15, a lens communicating unit 16, a camera information memory unit 17, an aberration correction computing unit 18, a displaying processor 19, an adjustment displaying unit 20, an adjusting controller 21, an adjusting position selector 22, an iris controller 23, a zoom controller 24 and a focus controller 25.

The image taking optical system 11 includes a lens 11a and a stop 11b disposed on an optical axis L so as to guide a beam from an object to the camera apparatus 3. The zoom controller 24 drives the image taking optical system 11 to change a focal length, and thereby, changes an image taking magnification. The iris controller 23 adjusts an aperture diameter of the stop 11b included in the image taking optical system 11. Further, the focus controller 25 drives the image taking optical system 11 so that an appropriate in-focus state is realized depending upon the image taking distance between the object and the image pickup apparatus. The zoom controller 24, the iris controller 23 and the focus controller 25 respectively drive and control the image taking optical system 11 based on a control signal given from the lens controller 14 of the lens apparatus 2.

The lens controller 14 not only drives and controls optical systems such as an iris, a zoom and a focus, but also obtains iris, zoom and focus positions. The iris-zoom-focus position detector 12 is a sensor for detecting the positions (states) of the iris, zoom and focus that are respective mobile parts of the lens apparatus 2. Each position information detected by the iris-zoom-focus position detector 12 is obtained by the iris-zoom-focus position obtainer 13, and is output to the aberration correction computing unit 18 as position information via the lens controller 14.

Further, the sending/receiving of data with respect to the camera apparatus 3, and the controlling process of the aberration correcting data of this embodiment are performed.

The aberration correction computing unit 18 computes and calculates aberration correcting data matched with lens position data required for controlling aberration correction in the connected camera apparatus 3 based on camera information obtained via the lens communicating unit 16, using lens position data input from the iris-zoom-focus position obtainer 13 and optical aberration correcting data stored in the optical aberration correcting data memory unit 15.

The optical aberration correcting data memory unit 15 is a non-volatile memory, which stores a data table for correcting optical aberration caused by the image taking optical system 11 in the lens apparatus 2 and also stores an optical aberration correcting data table after fine adjustment of the optical aberration correcting data.

The lens communicating unit 16 converts data received from the lens controller 14 to have a format defined by a communication protocol with respect to a camera and sends the resultant data to the camera apparatus 3.

The camera information memory unit 17 stores an image size of a CCD, the number of effective pixels of the CCD and the like, which are camera information obtained from the camera apparatus 3.

The displaying processor 19 performs a display control of the adjustment displaying unit 20 as information displaying unit of the lens apparatus 2 according to an instruction from the lens controller 14.

The adjustment displaying unit 20 is a display device provided in the lens apparatus 2, and includes, for example, a liquid crystal display. The adjustment displaying unit 20 plays a role as an information display apparatus when correcting aberration correcting data and displays parameters and selection determination when performing fine adjustment and selection determination of aberration correcting data.

Figure 2:
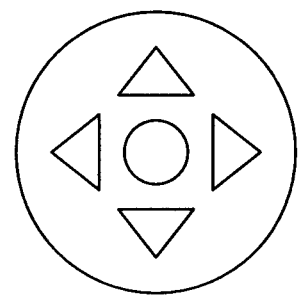
FIG. 2 is a diagram illustrating examples of an adjusting controller and an adjusting position selector of the present invention.

The adjusting controller 21 can perform direction selection using an arrow key or the like as illustrated in FIG. 2 and is provided for a user to input a control. A content of a control performed with respect to the adjusting controller 21 is converted into an electric signal and sent to the lens controller 14. The adjusting controller 21 switches parameters or changes numerical values in the adjustment displaying unit 20 and moves a cursor displayed on an image displaying unit 34.

The adjusting position selector 22 includes a pressure button switch and is provided for a user to input a control in the same way as in the adjusting controller 21. The adjusting position selector 22 determines a value changed by and an item selected by the adjusting controller 21 and determines after the movement of the cursor displayed on the image displaying unit 34.

The camera apparatus 3 includes a CCD 31, an image processor 32, an image outputting unit 33, an image displaying unit 34, a camera controller 35 and a camera communicating unit 36.

The camera controller 35 performs control of the camera apparatus 3, such as communication to the lens apparatus 2 and sending of optical aberration correcting data obtained from the lens apparatus 2 to the image processor 32.

The CCD 31 includes a color separating optical system (prism) that separates light for image taking input via the lens apparatus 2 into color beams of three colors: red (R), green (G) and blue (B), and image pickup elements corresponding to the respective color beams. The CCD 31 photoelectrically converts the color beams into three taken image signals (first, second and third color image signals) and send them to the image processor 32.

The image processor 32 performs image processing and aberration correcting process. In the aberration correcting process, the image processor 32 performs chromatic aberration correcting process with respect to a taken image signal input from the CCD 31, using the optical aberration correcting data obtained from the lens apparatus 2. The taken image signal subjected to the chromatic aberration correcting process is output to the image outputting unit 33 as an output image signal and displayed on the image displaying unit 34. In the image processor 32, not only the chromatic aberration correction but also various image processing with respect to the image displaying unit 34 described later are performed.

FIGS. 3, 4, 16A and 16B are flowcharts of the aberration correcting process of this embodiment achieved by the image pickup apparatus illustrated in FIG. 1.

Figure 16A:
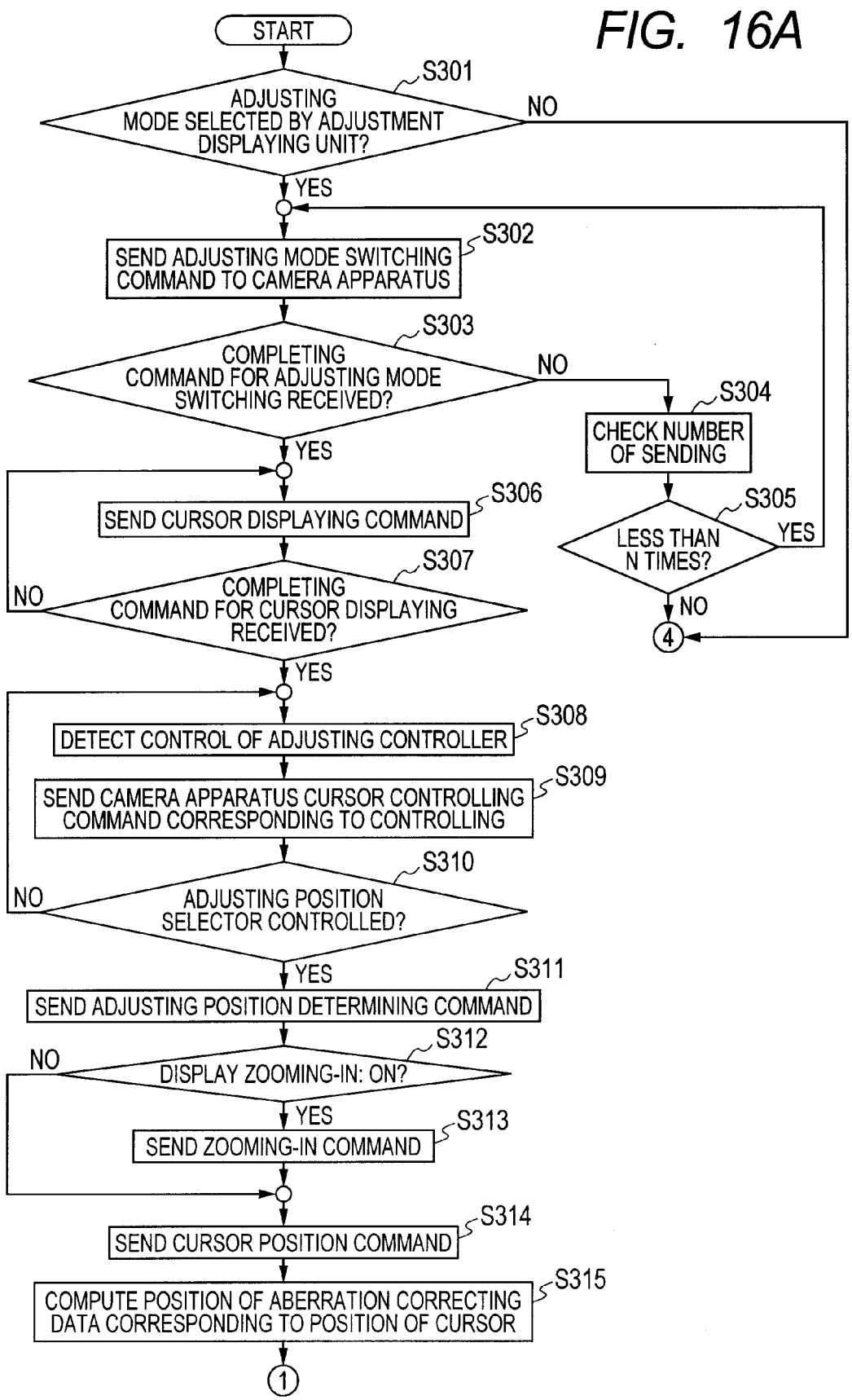
FIG. 16A is a flowchart (1) illustrating process in the image pickup apparatus of Embodiment 1 according to the present invention.
Figure 16B:
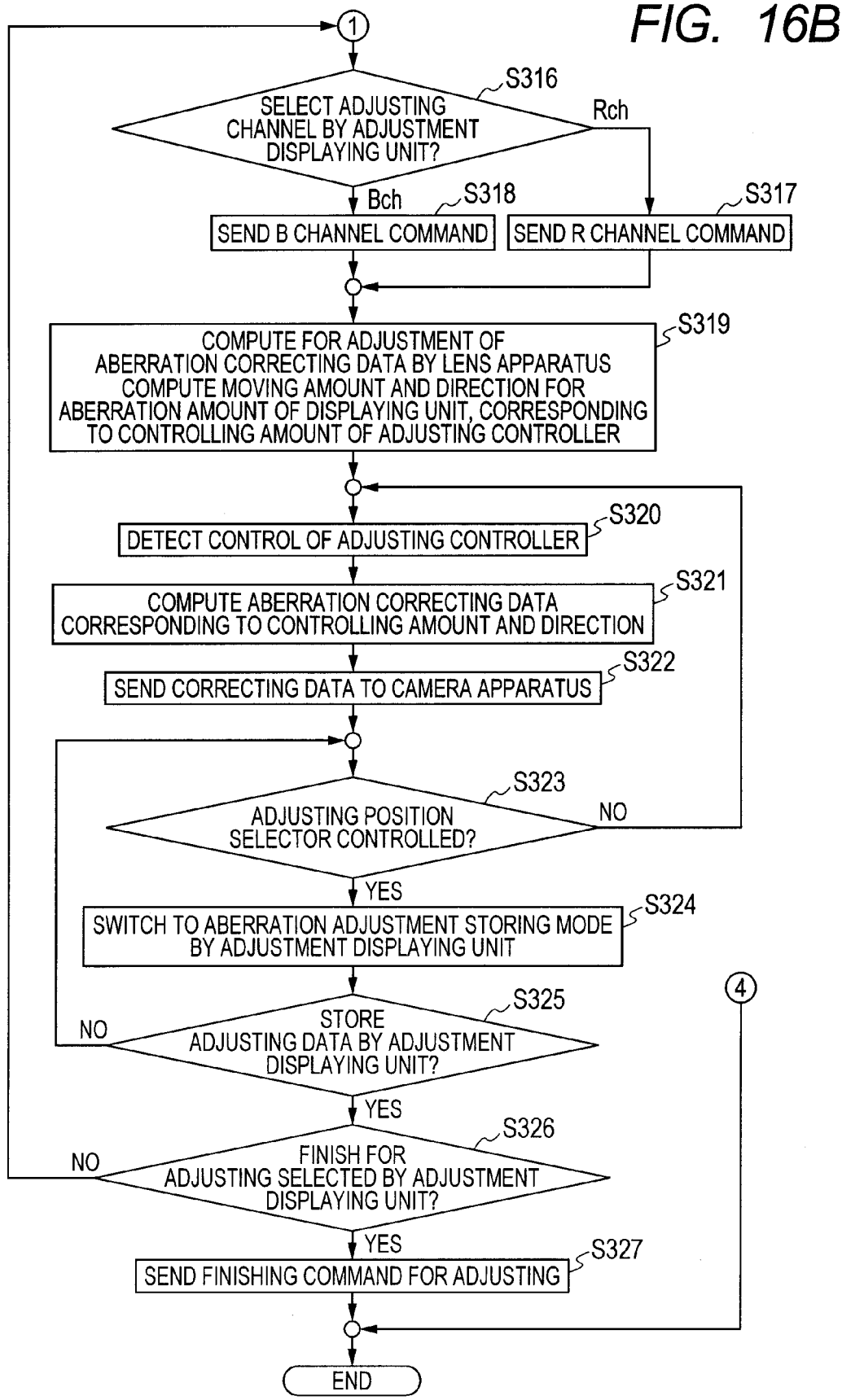
FIG. 16B is a flowchart (2) illustrating process in the image pickup apparatus of Embodiment 1 according to the present invention.

The flow of the aberration correcting process achieved by the lens apparatus is described with reference to the flowchart of FIG. 3 and this embodiment is described in detail with reference to FIGS. 4, 16A and 16B.

After power-on, it is checked whether serial communication to the camera apparatus 3 is established or not in Step S101.

When the lens apparatus 2 sends a connecting command to the camera apparatus 3 and the camera apparatus 3 returns serial communicating permission, the connection to the camera apparatus 3 is set as serial communication. If a connecting command is received from the camera apparatus 3 before a connecting command is sent from the lens apparatus 2, the lens apparatus 2 returns serial communicating permission to the camera apparatus 3, and the process proceeds to Step S103. If no serial communicating permission is received, the lens apparatus 2 determines that the connected camera apparatus 3 has no serial communicating function, and the process proceeds to Step S102.

Although the connection to the camera apparatus 3 is set to be a parallel mode in Step S102, the lens apparatus 2 is put in a state waiting for a serial connection confirming command from the camera apparatus 3.

If a connecting command is received from the camera apparatus 3, the process returns to Step S101. The lens apparatus 2 returns serial communicating permission to the camera apparatus 3 and the process proceeds to Step S103.

In Step S103, in order to confirm whether or not the camera apparatus 3 is capable of performing optical aberration correction, the lens apparatus 2 sends to the camera apparatus 3 a request if an aberration correction can be performed.

If the lens apparatus receives from the camera apparatus 3 an answer that an aberration correction can be performed in Step S104, it is determined that the camera apparatus 3 performs optical aberration correction, and the process proceeds to Step S105. If no command is received, the process is finished.

In Step S105, in the setting on the lens apparatus 2, the setting of whether aberration correction is made valid or invalid is checked. This is a function that allows a user to set whether or not to perform aberration correction in the setting on the lens apparatus 2.

The ON/OFF of aberration correction is set as follows. A selection switching screen is provided in the adjustment displaying unit 20 as illustrated in FIG. 4 so as to enable switching of ON/OFF of the aberration correction, and after the adjusting controller 21 moves a cursor and switches the ON/OFF of the aberration correction, then the setting is performed in the adjusting position selector 22.

In Step S106, it is determined whether the setting is valid or not. If the setting is invalid, the process proceeds to Step S107. Then, the aberration correction is set to be invalid and the aberration correcting data is not sent. If the setting is valid, the process proceeds to Step S108. Then, the aberration correction is set to be valid and the aberration correcting process is started.

The process proceeds to Step S109, and it is confirmed whether or not the aberration correction adjusting mode described later is in an ON state.

The ON/OFF of the aberration correction adjusting mode is set as follows. A selection switching screen is provided in the adjustment displaying unit 20 as illustrated in FIG. 4 so as to enable switching of ON/OFF of the aberration correction adjusting mode, and after the adjusting controller 21 moves a cursor and switches the ON/OFF, then the setting is performed in the adjusting position selector 22.

In the case where the aberration correction adjusting mode is ON, the process proceeds to an aberration correction adjusting mode subroutine in Step S114, and to perform aberration correction adjustment. The subroutine to adjust aberration correction is described later with reference to the flowchart of FIG. 5. In the case where the aberration correction adjusting mode is OFF, aberration correction is performed using the optical aberration correcting data (table) stored in the optical aberration correcting data memory unit 15.

The process proceeds to Step S110, and the current position information of an iris, a zoom and a focus of the lens apparatus 2 is detected by the iris-zoom-focus position detector 12 and obtained by the iris-zoom-focus position obtainer 13.

The process proceeds to Step S111. An image area used as an image of the CCD 31 of the camera apparatus 3, that is, a range required for optical aberration correction depending upon required precision is determined based on the obtained iris, zoom and focus position information, to thereby determine a sending data range. The optical aberration correcting data on the required sending data range is obtained (extracted) from the aberration correcting data (table) stored in the optical aberration correcting data memory unit 15, and the optical aberration correcting data to be sent to the camera apparatus 3 is computed.

If the information (an image size and the number of effective pixels of the CCD) on the camera apparatus 3 has been obtained, the optical aberration correction performed on the camera apparatus 3 only needs the information of the optical aberration correcting data on the range required for the image area of the CCD used for an image to be output and does not need optical aberration correcting data of the entire CCD image area.

The process proceeds to Step S112, and in the case where an aberration data sending permission command is sent and an aberration data obtaining command is not received from the camera apparatus 3, the process returns to Step S110. In the case where the aberration data obtaining command is received, the process proceeds to Step S113, and the optical aberration correcting data is sent.

The camera apparatus 3 performs aberration correcting process in the image processor 32 based on the received optical aberration correcting data and outputs an image signal after the aberration correction to the image displaying unit 34 or an image output terminal via the image outputting unit 33.

A series of flow of the aberration correcting process of this embodiment is as described above. Hereinafter, the aberration correction adjusting mode process (subroutine) is described with reference to the flowchart of FIG. 5.

Figure 6:
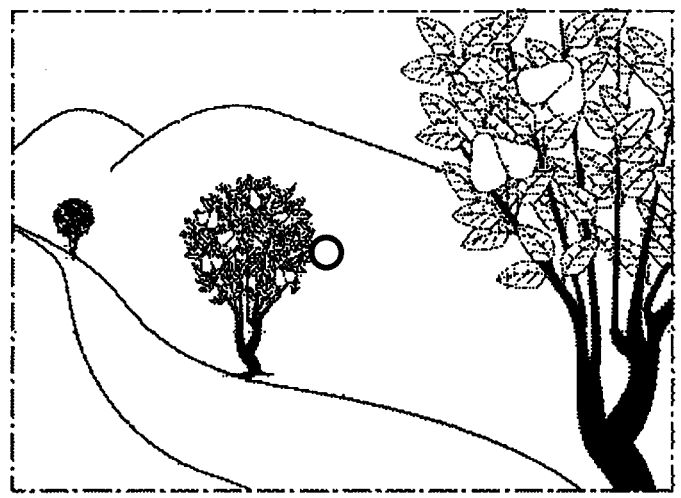
FIG. 6 illustrates an image in which a cursor is displayed in an image displaying unit of the present invention.

In Step S109, in the case where the aberration correction adjusting mode is selected in the adjusting controller 21 (S201), the process proceeds to Step S202, and the lens controller 14 sends a command to the image displaying unit 34 of the camera apparatus 3 via the lens communicating unit 16 and the camera communicating unit 36 so that a cursor display is performed as illustrated in FIG. 6. The camera controller 35 that has received the command performs image processing so that the cursor is superimposed on the image received from the CCD 31 in the image processor 32, and displays the image with the cursor superimposed thereon on the image displaying unit 34 via the image outputting unit 33.

When the cursor is displayed on the image displaying unit 34, the camera controller 35 sends a cursor display completing command to the lens apparatus 2. When the lens controller 14 on the lens apparatus 2 receives the cursor display completing command, the process proceeds to Step S203 and the cursor movement by the adjusting controller 21 is enabled. Regarding the cursor movement, in the same way as in the command for cursor display described above, the lens apparatus 2 sends a command according to the controlling amount of the adjusting controller 21 to the camera apparatus 3. The camera controller 35 having received the command controls so that the cursor on the image displaying unit 34 moves based on the control of the adjusting controller 21.

Figure 7A:
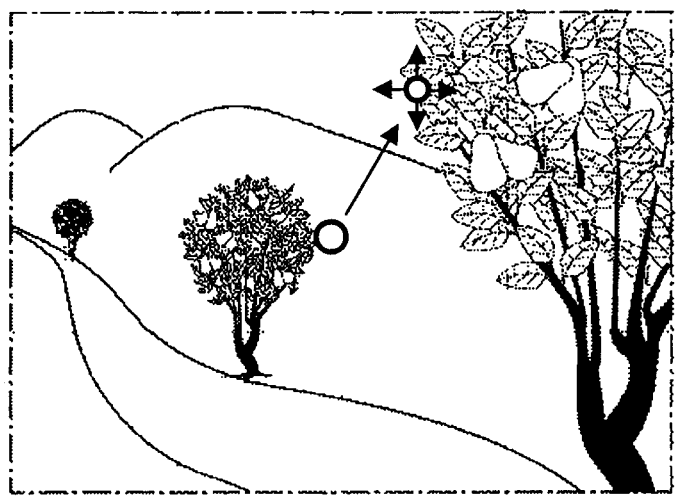
FIG. 7A illustrates an image in which a cursor is moved in the image displaying unit of the present invention.
Figure 7B:
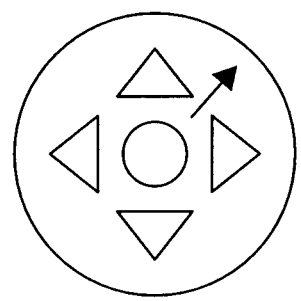
FIG. 7B illustrates a control of the adjusting controller for moving a cursor to a position illustrated in FIG. 7A.

The process proceeds to Step S204, and the adjusting controller 21 illustrated in FIG. 2 is controlled (for example, as illustrated in FIG. 7B), and thus, the cursor is moved to a point where the aberration correcting amount is desired to be adjusted as illustrated in FIG. 7A. When completing the movement of the cursor to the adjusting point, the process proceeds to Step S205. Then, the adjusting position selector 22 is controlled to determine the adjusting point.

Needless to say, regarding this control, the lens controller 14 sends a command via the lens communicating unit 16 and the camera communicating unit 36. The camera controller 35 having received the command performs image processing in the image processor 32 so that the movement and determination of the cursor are superimposed on the image from the CCD 31 and displays the resultant image on the image displaying unit 34 via the image outputting unit 33. Hereinafter, the above-mentioned expression is omitted so as to avoid the repetition thereof.

Figure 8:
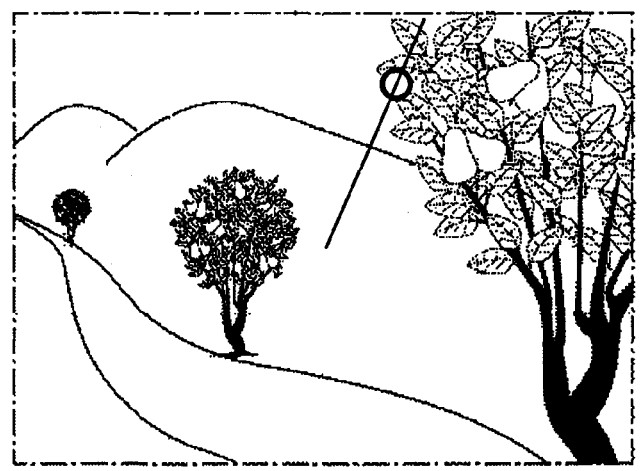
FIG. 8 illustrates an image in which a straight line is drawn toward a cursor from an image center (optical axis position) in the image displaying unit of the present invention.

The process proceeds to Step S206, and a straight line is displayed toward the determined adjusting position from a screen center (optical axis position) in the image displaying unit 34 (FIG. 8). The process proceeds to Step S207 and it is confirmed whether or not the screen is zoomed in with the determined cursor position being center. The ON/OFF of display zooming may be allocated to a switch disposed on the lens apparatus 2, or zooming in/out may be switched in the adjustment displaying unit 20.

Figure 9:
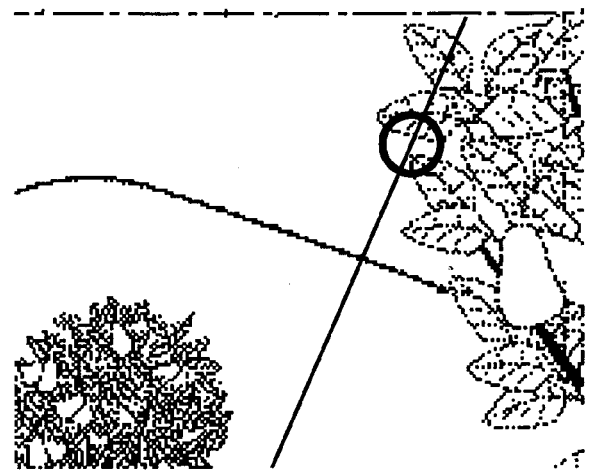
FIG. 9 illustrates an enlarged view of an image of a cursor display portion on the image displaying unit of the present invention.

If the display zooming is ON in Step S207, the process proceeds to Step S208, and the screen is zoomed in (FIG. 9). If the display zooming is OFF in Step S207, the process proceeds to Step S209, and the screen display remains unchanged.

The camera apparatus 3 detects the cursor position on the image displaying unit 34 via the image processor 32 in the camera controller 35 and sends the position with respect to the image center (optical axis position) to the lens apparatus 2.

When the image displaying unit 34 enters into this state, the user can confirm and adjust color, amount and direction of aberration while viewing the image on the image displaying unit 34, using the adjusting controller 21 and the adjusting position selector 22.

The adjustment is performed to a B channel and an R channel (second and third color image signals) respectively based on a G channel (first color image signal). The aberration correcting data of the B channel and the R channel is generated as follows.

Figure 10:
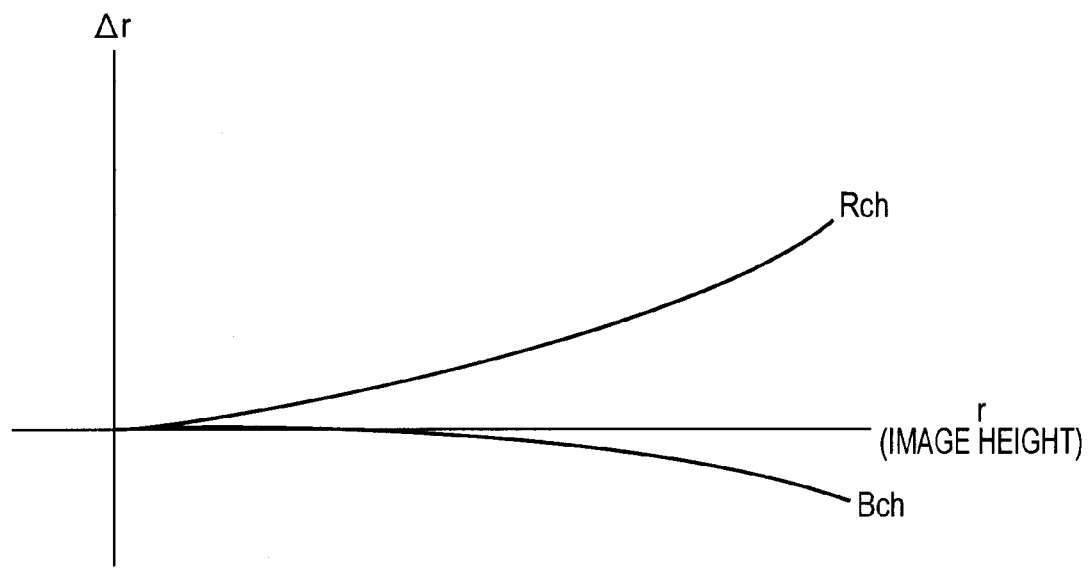
FIG. 10 is an R channel, a B channel lateral chromatic aberration diagram with respect to a G channel as a function of a distance from the image center (optical axis position) of the present invention.

The camera apparatus 3 includes a color separating optical system (prism) that separates light for image taking input via the lens apparatus 2 into color beams of three colors: red (R), green (G) and blue (B), and image pickup elements (CCD 31) corresponding to the respective color beams. Generally, the chromatic aberration caused by the image taking optical system increases as the distance from the optical axis position increases on the light-receiving surface of the CCD 31. FIG. 10 illustrates a magnification chromatic aberration diagram under certain image taking conditions. Displacement amounts ($\Delta r$) of imaging positions of light of the R channel, the B channel with respect to the imaging position of light of the G channel are illustrated as a function of a distance r in a circumferential direction from the image center (optical axis position). As illustrated in FIG. 10, the chromatic aberrations of the R channel and the B channel are obtained from optical simulation and actual measurement respectively in the R channel and the B channel with respect to the G channel as the displacements in a radial direction with respect to the optical axis position on the image. The chromatic aberrations of the R channel and the B channel increase with a distance from the optical axis position. That is, even with the light from the same object, the imaging position of the G channel and the imaging position of the R channel are not matched, and the displacement amount increases toward the peripheral portion.

The data for correcting aberration is created based on the data of the R channel and the B channel formed with respect to the G channel. This also applies to the other aberrations.

Figures 11, 12, 13:
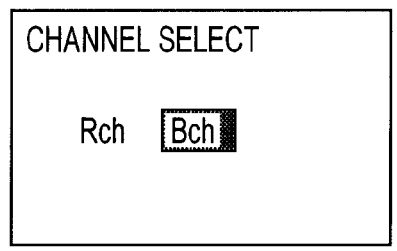
FIG. 11 illustrates an example (data table method) of aberration correcting data stored in a lens apparatus of the present invention.
FIG. 12 illustrates an example (coefficient table of correction converting formula) of aberration correcting data stored in the lens apparatus of the present invention.
FIG. 13 illustrates a display example of selectively switching an adjusting channel in the adjustment displaying unit of the present invention.

Those data can be expressed with a table as illustrated in FIG. 11 and indicate how much the image data at a distance from the optical axis position (image height r) is corrected in an image height direction to be displayed, for example, with the direction in which an image height increases being positive. The data for correcting aberration is required separately for the R channel and the B channel, and multiple tables are required according to the zoom, focus and iris positions.

The correcting amount ($\Delta r$) can also be expressed by a converting formula according to the distance (image height r) from the optical axis position. For example, in the case where the correcting amount ($\Delta r$) can be expressed by an approximate formula such as:

$$\Delta r = ar^3 + br^2 + cr + d \quad (1)$$

(where a, b, c and d are constants),
a coefficient table for the constants a, b, c and d corresponding to the zoom position, the focus position and the iris position is required as illustrated in FIG. 12, in the same way as in the case where the correcting amount is defined in the table.

In the lens apparatus 2, it is computed which portions in the aberration correcting data correspond to the received cursor position in view of the focus, zoom and iris positions.

The process proceeds to Step S210, and the image is confirmed. Then, the color desired to be adjusted, that is, the R channel or the B channel is confirmed on the display of the adjustment displaying unit 20 and selected in the adjusting position selector 22 (FIG. 13). In the case where the R channel is selected, the process proceeds to Step S211, and in the case where the B channel is selected, the process proceeds to Step S212. In the case of the R channel, the aberration correcting data of the R channel is adjusted, and in the case of the B channel, the aberration correcting data of the B channel is adjusted.

The process proceeds to Step S213, and the computing for adjustment of the aberration correcting data is performed in the lens apparatus 2. That is, how to handle the moving amount and direction of the channel selected on the image displaying unit 34 in the camera apparatus 3 of the selected channel is computed according to the controlling amount and direction of the adjusting controller 21. Here, the aberration occurs symmetrically with respect to the optical axis. Therefore, the direction for correcting aberration is the one leaving from the optical axis or the one approaching the optical axis. Therefore, after the position to be adjusted for aberration is selected, a straight line passing through the screen center (optical axis position) and the selected position is made displayed on the screen in the process of Step S206, and thus, an operator is likely to recognize the direction of adjusting aberration. Further, by allowing the straight line to be displayed, even when the optical axis position is out of sight from the screen due to the zoom-in of the screen, the operator can reliably recognize the direction in which the aberration can be adjusted.

In the case where the aberration correcting data is given by a table format or a converting formula format, computing corresponding to the respective formats is performed.

The process proceeds to Step S214, and the control of the adjusting controller 21 is detected. Then, in Step S215, the controlling amount of the adjusting controller 21 is converted into aberration correcting data of the selected the R channel or the B channel based on the result computed in Step S213.

The method of converting aberration correcting data is described below. Here, description is made regarding the case where the aberration correcting data is given by a table format, based on tables of the aberration correcting data of FIGS. 14A, 14B and 14C.

A data table to be adjusted and a portion of data in the table are obtained (extracted) from the cursor position on the image displaying unit 34 and the focus, zoom and iris positions. For example, when the portion of data calculated from the determined cursor position and focus, zoom and iris positions is a data position of a zoom position "4" of the aberration correcting data table and an image height (distance from the optical axis position) 2, the data position is the one of FIG. 14A, and the data is "1".

Then, when the adjusting controller 21 is controlled, the data of the aberration correcting data table is increased/decreased according to the controlling amount. Hereinafter, the case where the data changes at one portion is described, but multiple data may be increased/decreased according to the position and direction to be adjusted.

Then, when the data is assumed to change from "1" to "4" as a result of the adjustment of the control of the adjusting controller 21, the result is as illustrated in FIG. 14B. If the image is displayed as it is, only the color data of the correcting channel at the position of the image height 2 is shifted concentrically with respect to the optical axis position. Therefore, color image data of the channel at the screen position on a circle having its center at the optical axis position and having the radius of the image height 2 becomes discontinuous, and an unnatural image is displayed. Therefore, considering the difference between the changed data and the data on the periphery thereof, the peripheral aberration correcting data is computed according to the adjusted data "4" (change amount) in the lens controller 14 so that the data in the vicinity of the adjusted position (image height) does not change sharply, and the numerical value is changed as illustrated in FIG. 14C.

Due to the adjustment by smoothing, the image data of the channel at the screen position on the circle having its center at the optical axis position and having radius of the image height position "2" does not become discontinuous, and an image with the aberration of the channel at the position of the image height position "2" being corrected can be displayed. Further, by changing aberration correcting data with weighing similar to the method conducted for change in the zoom position with respect to the change direction of an iris and a focus, an image can be prevented from changing discontinuously even when the iris and focus are controlled from this state.

Further, in the case where adjustment is performed at multiple positions, the weighing of the peripheral data can be changed according to the respective adjusted data and corrected automatically. Conversely, the automatic correction of the peripheral data may not be performed.

The process proceeds to Step S216, and the converted data is sent to the camera apparatus 3. The camera apparatus 3 computes aberration correction of the selected channel according to the data in the image processor 32, and displays it on the image displaying unit 34.

When the process proceeds to Step S217 and the aberration adjustment is completed, the process proceeds to Step S218, and if the process is performed continuously, the process returns to Step S214. In Step S218, the display of the adjustment displaying unit 20 of the lens apparatus 2 is confirmed and the data adjusted by the control of the adjusting position selector 22 is stored (FIG. 15). In the case where the data is not stored, the process returns to Step S214. In the case where the process proceeds to Step S219, and the finish for the adjusting mode is selected in the adjustment displaying unit 20, the aberration correction adjusting mode processing is finished. In the case where the aberration correction adjusting mode process is not finished, the process returns to Step S210, and the adjustment is performed continuously.

The entire flow of the aberration correction adjusting mode processing is described above. Hereinafter, the process on the lens apparatus 2 is described in detail with reference to flow charts of FIGS. 16A and 16B.

Figure 3:
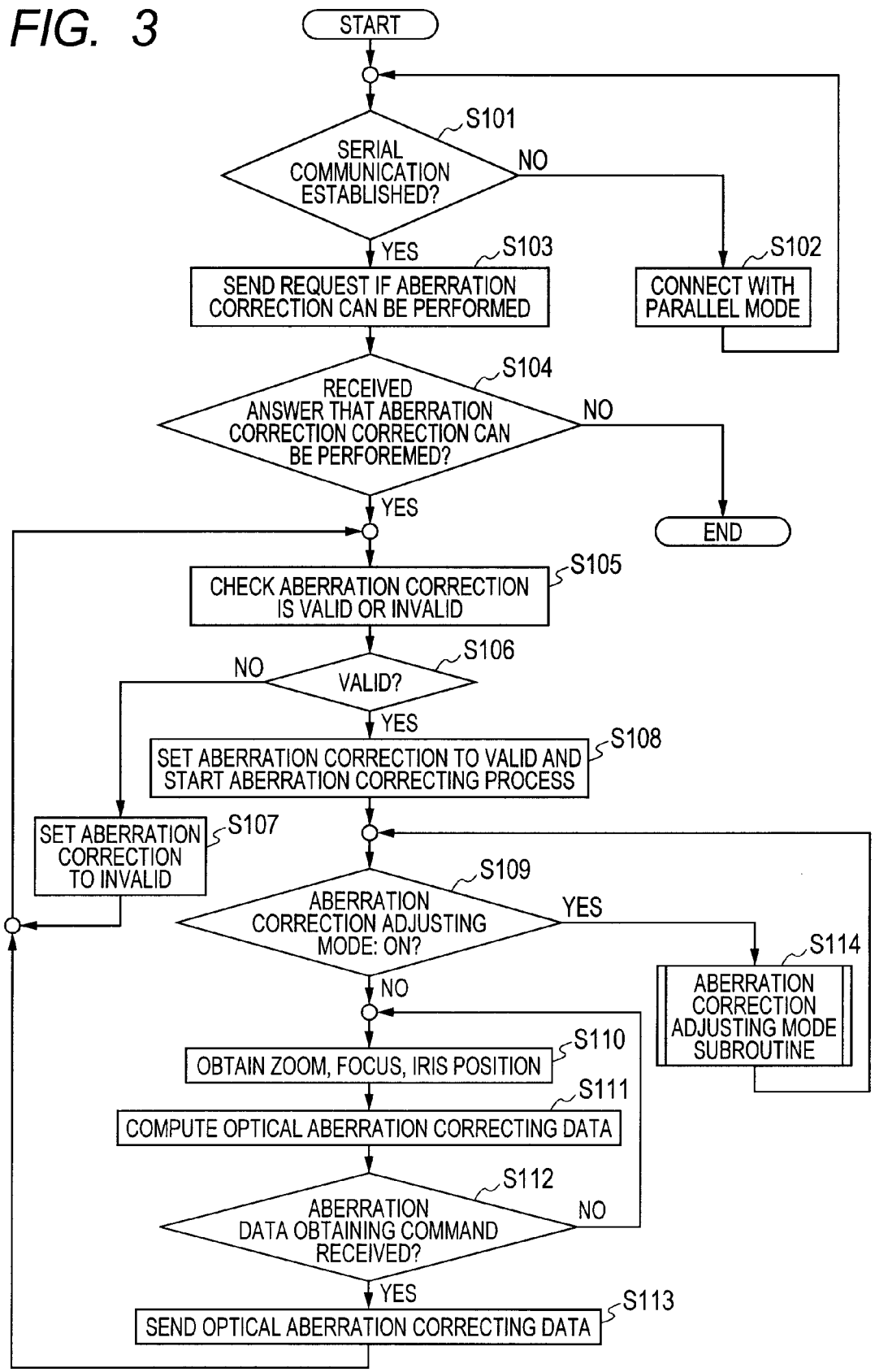
FIG. 3 is a flowchart illustrating process in an image pickup apparatus of Embodiment 1 according to the present invention.
Figure 5:
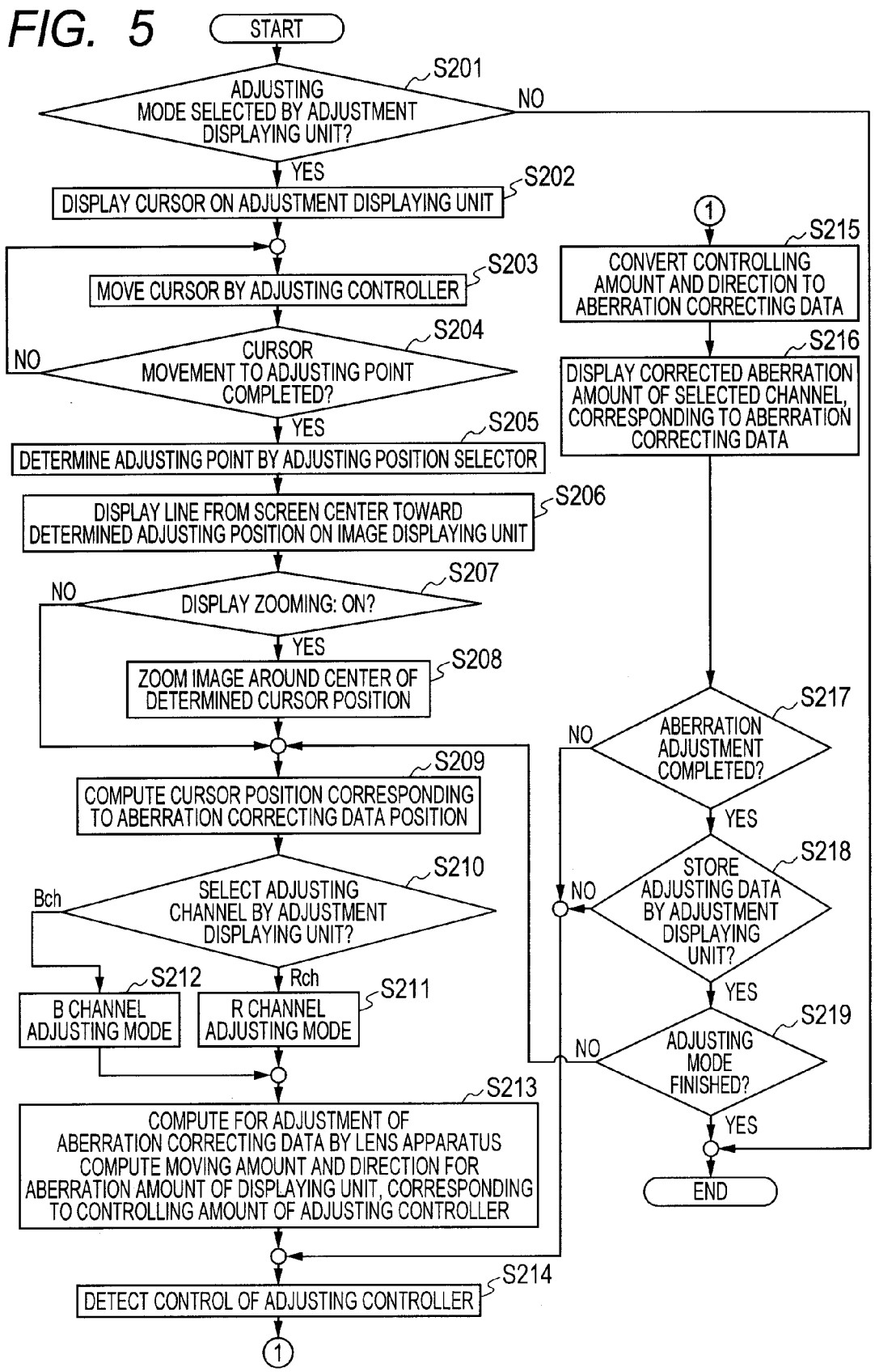
FIG. 5 is a flowchart illustrating process in the image pickup apparatus of Embodiment 1 according to the present invention.

In the case where the display of the adjustment displaying unit 20 is confirmed and the aberration correction adjusting mode is selected by the control of the adjusting position selector 22 in Step S109 of FIG. 3 (S301), the process proceeds to Step S302 and the lens controller 14 sends an adjusting mode switching command via the lens communicating unit 16 and the camera communicating unit 36. In the case where the adjusting mode is not selected, the processing is finished.

The camera controller 35 having received the adjusting mode switching command performs adjusting mode switching process on the camera apparatus 3, and sends a completing command for adjusting mode switching to the lens apparatus 2. Therefore, it is determined whether or not the lens controller 14 received the completing command for adjusting mode switching. In the case where the lens controller 14 has not received the adjusting mode switching command, the process proceeds to Step S304 and checks the number of sending of the adjusting mode switching command. The adjusting mode switching command is sent a predetermined number of times, and the number of sending is confirmed in Step S305. If the number of sending is equal to or less than the predetermined number (N times), the process returns to Step S302. When the number of sending exceeds the predetermined number, the switching to the adjusting mode cannot be performed, and hence, the routine is finished.

In the case where the lens controller 14 received the completing command for adjusting mode switching in Step S303, the process proceeds to Step S306, and the lens controller 14 sends a cursor displaying command to the camera controller 35 via the lens communicating unit 16 and the camera communicating unit 36 so that a cursor display is performed on the image displaying unit 34 of the camera apparatus 3 as illustrated in FIG. 6. The camera controller 35 having received the cursor displaying command performs image processing so that the cursor is superimposed on the image from the CCD 31 in the image processor 32, and displays the resultant image on the image displaying unit 34 via the image outputting unit 33.

When the cursor is displayed on the image displaying unit 34, the camera controller sends a completing command for cursor displaying, and the lens controller 14 confirms whether or not the lens controller 14 has received the completing command for cursor displaying (S307). In the case where the lens controller 14 has received the completing command for cursor displaying, the process proceeds to Step S308. In the case where the lens controller 14 has not received the completing command for cursor displaying, the process returns to Step S306. In Step S308, the lens controller 14 detects the control of the adjusting controller 21. The process proceeds to Step S309, and the lens controller 14 sends a cursor controlling command according to the control of the adjusting controller 21 to the camera apparatus 3.

The camera apparatus 3 receives the cursor controlling command, which enables the adjusting controller 21 to move the cursor. Regarding the movement of the cursor, the lens apparatus 2 sends a command according to the controlling amount of the adjusting controller 21 to the camera apparatus 3 in the same way as in the cursor displaying command described above. The camera controller 35 having received the command controls the cursor on the image displaying unit 34 so that the cursor moves based on the control of the adjusting controller 21. As illustrated in FIG. 7A, the camera controller 35 moves the cursor to an arbitrary position in the screen for which the aberration correcting amount is desired to be adjusted. In the case where the cursor movement to the adjusting position has been completed, the process proceeds to Step S310, and whether or not the adjusting position selector 22 has been controlled is determined. If the adjusting position selector 22 has been controlled, the adjusting point is determined, and the process proceeds to Step S311. In Step S311, an adjusting position determining command is sent to the camera apparatus 3. If the control has not been confirmed, the process returns to Step S308 to detect the control of the adjusting controller 21.

The camera controller 35 having received the adjusting position determining command performs image processing in the image processor 32 so that the movement and determination of the cursor is superimposed on the image obtained from the CCD 31, and displays the image on the image displaying unit 34 via the image outputting unit 33. The image displaying unit 34 displays a straight line toward the determined adjusting position from a screen center (optical axis position) as illustrated in FIG. 8. The process proceeds to Step S312, and whether or not the screen is zoomed in with respect to the determined cursor position is confirmed.

The ON/OFF of display zooming may be allocated to a switch disposed on the lens apparatus 2, or zooming in/out may be switched in the adjustment displaying unit 20.

In the case where the zooming of the screen has been selected in Step S312, the process proceeds to Step S313, and a zooming command is sent. The camera apparatus having received the zooming command zooms in the screen (FIG. 9). In the case where the zooming of the screen has not been selected, the process proceeds to Step S314 without zooming in the screen.

After that, in the camera controller 35, the camera apparatus 3 detects the position of the cursor on the image displaying unit 34 via the image processor 32 and sends the position from the image center (optical axis position) as a cursor position command. Then, the lens apparatus 2 receives the cursor position command (S314), and the process proceeds to Step S315. The lens apparatus 2 computes the portions of the aberration correcting data which corresponds to the focus, zoom and iris positions and the received cursor position.

When the image displaying unit 34 enters into this state, the user can confirm and adjust the color, amount and direction of aberration while viewing the image on the image displaying unit 34, using the adjusting controller 21 and the adjusting position selector 22.

The process proceeds to Step S316, and the image is confirmed. Then, the color desired to be adjusted, that is, the R channel or the B channel is confirmed on the display of the adjustment displaying unit 20 and selected by the control of the adjusting position selector 22 (FIG. 13). In the case where the R channel is selected, the process proceeds to Step S317, and in the case where the B channel is selected, the process proceeds to Step S318. In the case of the R channel, the aberration correcting data for the R channel is adjusted, and in the case of the B channel, the aberration correcting data for the B channel is adjusted.

The process proceeds to Step S319, and the lens apparatus 2 performs computation for adjustment of the aberration correcting data. That is, how to apply the moving amount and direction of the channel selected on the image displaying unit 34 in the camera apparatus 3 of the selected channel to the aberration correcting data is computed according to the controlling amount and direction of the adjusting controller 21.

In the case where the aberration correcting data is given by a table format or a converting formula format, computation corresponding to the respective formats is performed.

The process proceeds to Step S320, and the control of the adjusting controller 21 is detected. Then, based on the result of the computation in Step S319, the controlling amount and direction of the adjusting controller 21 are converted into the aberration correcting data of the selected channel in Step S321. The process proceeds to Step S322, and the converted data is sent to the camera apparatus 3. The camera apparatus 3 performs aberration correction computation of the selected channel according to the data in the image processor 32, and displays the image subjected to the aberration correction on the image displaying unit 34.

Then, the process proceeds to Step S323, and it is determined whether or not the adjusting position selector 22 has been controlled. This control indicates that the aberration adjustment has been completed, and the process proceeds to Step S324. In the case where the adjusting position selector 22 has not been controlled, the adjusting controller 21 can continuously adjust the aberration, that is, the process returns to Step S320. In Step S324, in order to store the adjusting data, in the adjustment displaying unit 20 of the lens apparatus 2, the adjustment displaying unit 20 is switched to an aberration adjustment storing mode, and in Step S325, the adjusting data can be stored by the operation of the adjusting controller 21 and the adjusting position selector 22 (FIG. 15). In the case where the adjusting data is not stored, the process returns to Step S323. In the case where the process proceeds to Step S326, and the finish for the adjusting mode is selected in the adjustment displaying unit 20, the aberration correction adjusting mode process is finished. Then, the process proceeds to Step S327, and the finishing command for adjusting mode is sent to the camera apparatus 3. In the case where the adjusting mode has not been finished, the process returns to Step S316, and the adjustment is continuously performed.

The exemplary embodiment of the present invention is described. However, the present invention is not limited to those embodiments, and those embodiments can be modified and changed variously within the scope of the spirit of the present invention.

Embodiment 2

Hereinafter, Embodiment 2 of the present invention is described with reference to a flowchart of FIG. 17.

In Embodiment 1, assuming that the optical axis is at an optical axis position in terms of design, for example, at the center of a screen, a method of adjusting aberration outside the optical axis occurring on the periphery of the screen in a circumferential direction with respect to the optical axis position is described. More specifically, it is presumed that the lens apparatus 2 is attached to the camera apparatus 3 in an ideal state, and the optical axis of the lens apparatus 2 and that of the camera apparatus 3 are matched.

As described above, the current camera apparatus 3 includes the three-plate type CCD 31, and includes a color separating optical system (prism) that separates light for image taking input via the lens apparatus 2 into color beams of three colors: red (R), green (G) and blue (B), and image pickup elements corresponding to the respective colors. When those three image pickup elements are mounted on the color separating optical system, a lens to be the reference, called a master lens, is generally used. Then, the image pickup elements of the R channel and the B channel are respectively mounted with the G channel being the reference so that the center axis (optical axis) is not displaced when the light incident through the master lens is input to the image processing unit via the respective image pickup elements of red (R), green (G) and blue (B).

However, in the same way as in the aberration of Embodiment 1, with respect to the master lens, due to variations (production errors, individual difference, etc.) of optical performance of a lens apparatus to be actually attached to a camera apparatus, the position of the optical axis when adjusted using the master lens is not always matched completely with the position of the optical axis when the lens apparatus to be actually used is attached.

Considering the above, in this embodiment, a correction method in the case where the optical axes of the lens apparatus 2 and the camera apparatus 3 are displaced is described below.

Since the configuration of the image taking apparatus such as a TV camera system for carrying out this embodiment is similar to that of Embodiment 1 illustrated in FIG. 1, the description thereof is omitted.

Figure 17:
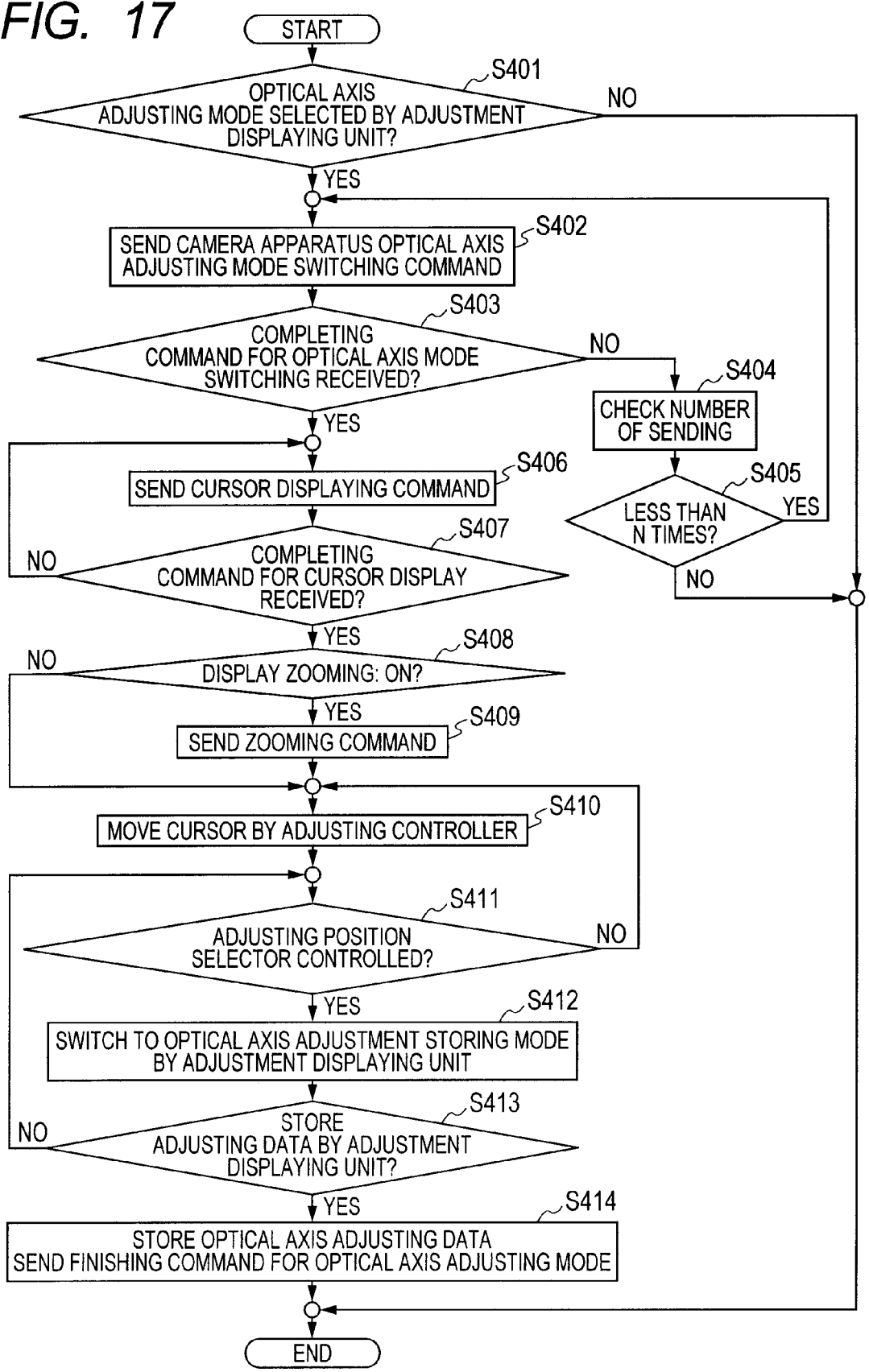
FIG. 17 is a flowchart illustrating process in an image pickup apparatus of Embodiment 2 of the present invention.

FIG. 17 is a flowchart of this embodiment achieved by the image pickup apparatus illustrated in FIG. 1. This embodiment is described in detail with reference to the flowchart of FIG. 17.

When an optical axis adjusting mode is selected by the adjustment displaying unit 20 in Step S401, the process proceeds to Step S402, and the lens controller 14 sends an optical axis adjusting mode switching command to the camera controller 35 via the lens communicating unit 16 and the camera communicating unit 36. In the case where the optical axis adjusting mode is not selected, the processing is finished.

The camera controller 35 having received the optical axis adjusting mode switching command performs optical axis adjusting mode switching process on the camera apparatus 3 and sends a completing command for optical axis adjusting mode switching to the lens apparatus 2. In the optical axis adjusting mode, the camera apparatus 3 does not control aberration correction and displays image data that has not been subjected to the aberration correction on the image displaying unit 34. In Step S403, it is determined that the completing command for optical axis adjusting mode switching has been received. In the case where the completing command for optical axis adjusting mode switching has not been received, the process proceeds to Step S404, and the number of sending of the optical axis adjusting mode switching command is checked. The optical axis adjusting mode switching command is sent a predetermined number of times, and the number of sending is subjected to the determination in Step S405. If the number of sending is equal to or less than the predetermined number, the process returns to Step S402. If the number of sending exceeds the predetermined number, the switching to the optical axis adjusting mode cannot be performed, and hence, the processing is finished.

Figure 18A:
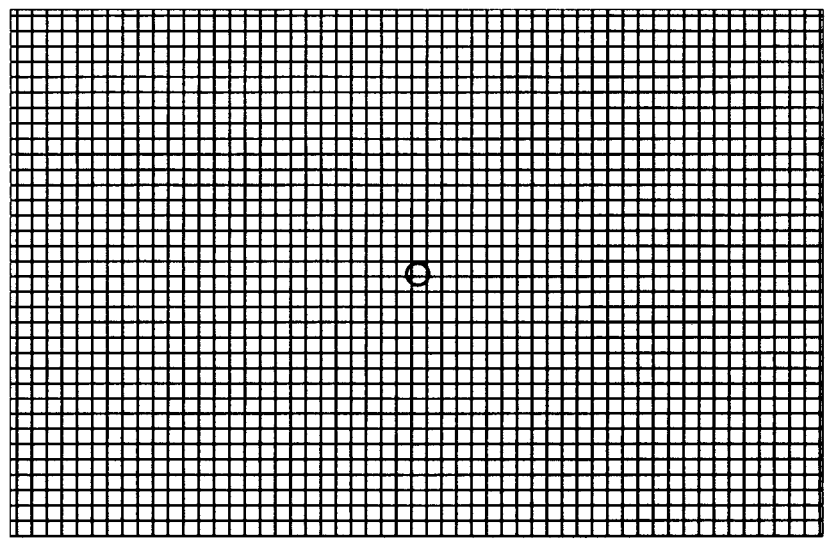
FIG. 18A illustrates the case of taking an image of a test pattern 1 using an image in which a cursor is displayed in the image displaying unit of Embodiment 2 of the present invention.
Figure 18B:
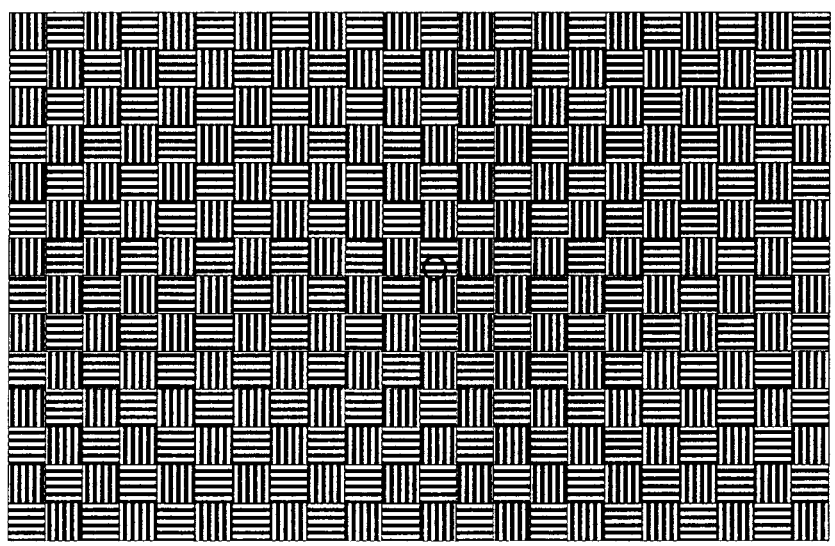
FIG. 18B illustrates the case of taking an image of a test pattern 2 using an image in which cursor is displayed in the image displaying unit of Embodiment 2 according to the present invention.

In the case where the completing command for optical axis adjusting mode switching is received in Step S403, the process proceeds to Step S406. For ease of the recognition of aberration, it is preferred to adjust an optical axis while taking images of patterns for a test as illustrated in FIGS. 18A and 18B. The lens controller 14 sends a cursor displaying command to the image displaying unit 34 of the camera apparatus 3 via the lens communication unit 16 and the camera communicating unit 36 so as to display a cursor as illustrated in FIGS. 18A and 18B.

The camera controller 35 having received the cursor displaying command performs image processing so that the cursor is superimposed on the image obtained from the CCD 31 in the image processor 32 and displays the image on the image displaying unit 34 via the image outputting unit 33. Although the cursor may have a shape of a point as in Embodiment 1, the cursor desirably has a shape in which a center point can be defined easily, such as a circle or a cross mark.

When the cursor is displayed on the image displaying unit 34, the camera controller sends a completing command for cursor displaying, and hence, it is determined whether or not the completing command for cursor displaying has been received (S407). In the case where the lens controller 14 on the lens apparatus 2 has received the completing command for cursor displaying, the process proceeds to Step S408. In the case where the lens controller 14 has not received the completing command for cursor displaying, the process returns to Step S406. In Step S408, it is determined whether or not the displaying of the image on the screen is zoomed-in with respect to the determined cursor position.

The ON/OFF of the zooming-in may be allocated to a switch disposed on the lens apparatus 2, or zooming in/out may be switched in the adjustment displaying unit 20.

The process proceeds to Step S409. In the case where the zooming-in is ON in Step S408, the zooming-in command is sent, and the camera apparatus having received the zooming-in command zooms in the screen. In the case where the display zooming is OFF, the screen remains as it is. In Embodiment 2, since the optical axis position having the smallest aberration is specified while the screen data that has not been subjected to the aberration correction is observed, the optical axis position is likely to be specified when the screen is zoomed in. However, according to the present invention, the optical axis position can be specified in the following flow irrespective of the presence/absence of the zooming-in of the screen.

The process proceeds to Step S410. The user moves the cursor to the position (optical axis position) in the screen having the smallest displacement (aberration) of three colors of RGB, using the adjusting controller 21 and the adjusting position selector 22, while viewing the image on the image displaying unit 34.

Then, the process proceeds to Step S411, and it is determined whether or not the adjusting position selector 22 to be controlled when the optical axis adjustment is completed has been controlled. In the case where the adjusting position selector 22 has been controlled, the process proceeds to Step S412. In the case where the adjusting position selector 22 has not been controlled, the adjusting controller 21 continuously adjusts an optical axis and hence, the process returns to Step S410. In Step S412, the adjustment displaying unit 20 of the lens apparatus 2 stores the adjusted data. Therefore, the adjustment displaying unit 20 is switched to an optical axis adjustment storing mode, and in Step S412, the adjusting data can be stored by the control of the adjusting controller 21 and the adjusting position selector 22. In the case where the adjusting data is not stored, the process returns to Step S411. The process proceeds to Step S414, and the optical axis adjusting mode process is finished in the adjustment displaying unit 20, and the process proceeds to Step S414, and a finishing command for optical axis adjusting mode is sent to the camera apparatus 3.

After the completion of the optical axis adjustment, aberration correction process can be performed as described in Embodiment 1 by applying aberration correcting data to the image height with the newly set optical axis position being the reference. That is, by shifting the aberration correcting data to the center of the screen based on a displacement amount of the optical axes and applying the aberration correcting data to image pickup video signals of the R channel and the B channel, satisfactory aberration correction can be performed.

The precondition for carrying out optimum aberration correction can be provided by carrying out the optical axis adjusting process when the lens apparatus is attached to the camera apparatus.

Further, this embodiment illustrates that an optical axis is adjusted while the images of the test patterns as illustrated in FIGS. 18A and 18B are taken. However, this embodiment is not limited thereto, and needless to say, similar optical axis adjusting process can be performed even with respect to an object during ordinary image taking.

The exemplary embodiment of the present invention has been described above. However, the present invention is not limited thereto and can be modified and changed variously within the scope of the spirit of the present invention.

As described above, according to the present invention, in the case where there are variations in production errors and individual differences in the image pickup apparatus capable of correcting aberration using aberration correcting data, the adjusting unit provided in the lens apparatus adjusts aberration on the screen while observing the aberration amount on the screen to which an image is output, in the correcting data to be sent/received between the lens apparatus and the camera apparatus connected thereto. Thus, the stored aberration correcting data is changed according to the adjustment amount and re-stored, which enables aberration correction as intended by the user.

This application claims the benefit of Japanese Patent Application No. 2010-084031, filed Mar. 31, 2010, which is hereby incorporated by reference herein in its entirety.

The invention claimed is:

1. An image pickup apparatus, comprising:
a lens apparatus comprising an image taking optical system configured to guide a beam from an object to a camera apparatus, the lens apparatus being attached to the camera apparatus detachably; and
a camera apparatus that separates the beam from the object into color beams of three colors and photoelectrically converts the color beams into a first color image signal, a second color image signal and a third color image signal by corresponding image pickup elements to display, on an image displaying unit, an image obtained by superimposing the first color image signal, the second color image signal and the third color image signal,
wherein the lens apparatus further comprises:
a memory unit that stores, as correcting data including a parameter indicating a state of the image taking optical system, a correcting amount in an image height direction with respect to an image height in each of the second color image signal and the third color image signal, the correcting amount being obtained with the first color image signal being a reference, in order to correct aberration caused by the image taking optical system; and
a lens controlling unit that extracts the correcting data corresponding to the state of the image taking optical system from the memory unit,
wherein the camera apparatus comprises a camera controlling unit that moves the second color image signal and the third color image signal in the image height direction to correct the second color image signal and the third color image signal based on the correcting data, and displays, on the image displaying unit, an image obtained by superimposing the corrected second color image signal and the corrected third color image signal,
wherein the image pickup apparatus further comprises a controlling unit configured to specify an arbitrary position of the image displayed on the image displaying unit and to set the correcting amount of the correcting data at the specified arbitrary position, and
wherein the lens controlling unit adjusts the correcting data based on the correcting amount of the correcting data at the arbitrary position set by using the controlling unit, and the memory unit stores the adjusted correcting data.

2. An image pickup apparatus according to claim 1, wherein the state of the image taking optical system indicated by the parameter of the correcting data comprises a state of a zoom, a focus and an iris of the image taking optical system.

3. An image pickup apparatus according to claim 1, wherein the correcting data comprises a table of a coefficient of a converting formula indicating the correcting amount with respect to the image height.

4. An image pickup apparatus according to claim 1, wherein the correcting data comprises a data table.

5. An image pickup apparatus according to claim 1, wherein, when a position at which adjustment is carried out is specified in the image displayed by the image displaying unit, the camera controlling unit displays, on the image displaying unit, a straight line passing through the specified position at which the adjustment is carried out and an optical axis position.

6. An image pickup apparatus according to claim 1, wherein the camera controlling unit sets a displacement amount between an optical axis of the lens apparatus and an optical axis of the camera apparatus, and corrects the aberration by shifting the correcting data with respect to a center of a screen based on the displacement amount between the optical axes and applying the correcting data to the second color image signal and the third color image signal.

7. An aberration correcting method for an image pickup apparatus including a lens apparatus and a camera apparatus, the lens apparatus having an image taking optical system configured to guide a beam from an object to the camera apparatus, and a memory unit that stores, as correcting data, a correcting amount with respect to an image height for correcting aberration caused by the image taking optical system, the lens apparatus being attached to the camera apparatus detachably, the camera apparatus being configured to separate the beam from the object into color beams of three colors and to photoelectrically convert the color beams into a first color image signal, a second color image signal and a third color image signal to display, on an image displaying unit, an image obtained by superimposing the first color image signal, the second color image signal and the third color image signal, wherein the correcting data indicates a correcting amount in an image height direction with respect to the image height in each of the second color image signal and the third color image signal, the correcting amount being obtained with the first color image signal being a reference, and including a parameter indicating a state of the image taking optical system, and wherein the aberration correcting method for the image pickup apparatus comprises:

extracting the correcting data corresponding to the state of the image taking optical system from the memory unit;

correcting the second color image signal and the third color image signal by applying the correcting data corresponding to the second color image signal and the third color image signal, and displaying, on the image displaying unit, an image obtained by superimposing the first color image signal, the second color image signal and the third color image signal; and in a case where a controlling unit of the image pickup apparatus is controlled to specify an arbitrary position of the image displayed on the image displaying unit, selecting one of the second color image signal and the third color image signal, and changing the correcting data at the specified arbitrary position of the selected one of the second color image signal and the third color image signal, reflecting the change on the correcting data of the selected one of the second color image signal and the third color image signal based on the image height and a change amount corresponding to the arbitrary position of the image for which the correcting data is changed, and displaying, on the image displaying unit, an image obtained by superimposing the first color image signal, the second color image signal and the third color image signal.

8. An aberration correcting method for an image pickup apparatus according to claim 7, wherein the state of the image taking optical system indicated by the parameter of the correcting data comprises a state of a zoom, a focus and an iris of the image taking optical system.

9. An aberration correcting method for an image pickup apparatus according to claim 7, further comprising displaying, on the image displaying unit, when a position at which the correcting data is changed is specified in the image displayed by the image displaying unit, a straight line passing through the specified position at which the correcting data is to be changed and an optical axis position.

10. An aberration correcting method for an image pickup apparatus according to claim 7, further comprising:

setting a displacement amount between an optical axis of the lens apparatus and an optical axis of the camera apparatus; and correcting the aberration by shifting the correcting data with respect to a center of a screen based on the displacement amount between the optical axes and applying the correcting data to the second color image signal and the third color image signal.

11. An image pickup system, comprising:

a camera apparatus having an image pickup element; and a lens apparatus having an image taking optical system configured to guide a beam from an object to the image pickup element, the lens apparatus being attached to the camera apparatus detachably, wherein the lens apparatus further comprises:

a memory unit configured to store correcting data to correct lateral chromatic aberration due to the image taking optical system; and a lens controller configured to extract correcting data corresponding to the state of the image taking optical system from the memory unit among correcting data stored in the memory unit, wherein the image pickup system further comprises a controller configured to change correcting data extracted by the lens controller from the memory unit, and wherein the lens controller is configured to store correcting data changed by the controller in the memory unit.

12. An image pickup system according to claim 11, wherein the state of the image taking optical system comprises a state of a zoom, a focus and an iris of the image taking optical system.

13. An image pickup system according to claim 11, wherein correcting data stored in the memory comprises a table of a coefficient of a converting formula indicating the correcting amount with respect to the image height.

14. An image pickup system according to claim 11, wherein correcting data stored in the memory comprises a data table.

15. An image pickup system according to claim 11 further comprising an image display unit configured to display an image picked up by the image pickup element, wherein the camera apparatus comprises a camera controller configured to display, on the image display unit, an image corrected based on correcting data changed by the controller, wherein the camera controller specifies an arbitrary position, as a specified position, on an image displayed in the image displaying unit, and changes correcting data corresponding to the specified position, and wherein the camera controller displays a straight line passing through the specified position and an optical axis position when the specified position is specified.

16. An image pickup system according to claim 1, wherein the camera controller shifts correcting data extracted from the memory unit with respect to a center of a screen based on a displacement amount between an optical axis of the lens apparatus and an optical axis of the camera apparatus, to correct the lateral chromatic aberration.

17. An aberration correcting method for an image pickup system including a camera apparatus and a lens apparatus, the camera apparatus having an image pickup element, the lens apparatus having an image taking optical system configured to guide a beam from an object to the image pickup element and a memory, the aberration correcting method comprising:

extracting correcting data corresponding to the state of the image taking optical system among correcting data for correcting lateral chromatic aberration due to the image taking optical system stored in the lens apparatus;

changing the extracted correcting data; and storing the changed correcting data in the memory of the lens apparatus.

18. An aberration correcting method for an image pickup system according to claim 17, wherein the state of the image taking optical system comprises a state of a zoom, a focus and and iris of the image taking optical system.

19. An aberration correcting method for an image pickup apparatus according to claim 17, wherein the image pickup system has an image displaying unit configured to display an image picked up by the image pickup element and the camera apparatus displays an image corrected based on correcting data changed on the image displaying unit, the method further comprising:

specifying an arbitrary position in an image displayed on the image displaying unit; and displaying, when the specified position is specified in a case where an arbitrary position in an image displayed by the image displaying unit is specified to change correcting data corresponding to the specified position which was specified, a straight line passing through the specified position and an optical axis position.

20. An aberration correcting method for an image pickup apparatus according to claim 17, further comprising correcting lateral chromatic aberration by shifting a picked up image by correcting data with respect to a center of a screen based on a displacement amount between an optical axis of the lens apparatus and an optical axis of the camera apparatus.

21. A lens apparatus being attached to a camera apparatus detachably and having an image taking optical system for guiding a beam from an object to the image pickup element, comprising:
- a memory unit configured to store correcting data to correct lateral chromatic aberration due to the image taking optical system;
- a lens controller configured to extract a correcting data corresponding to the state of the image taking optical system from the memory unit among correcting data stored in the memory unit; and
- a controller configured to change correcting data extracted by the lens controller from the memory unit,
- wherein the lens controller is configured to store correcting data changed by the controller in the memory unit.

* * * * *